United States Patent Office 3,318,665
Patented May 9, 1967

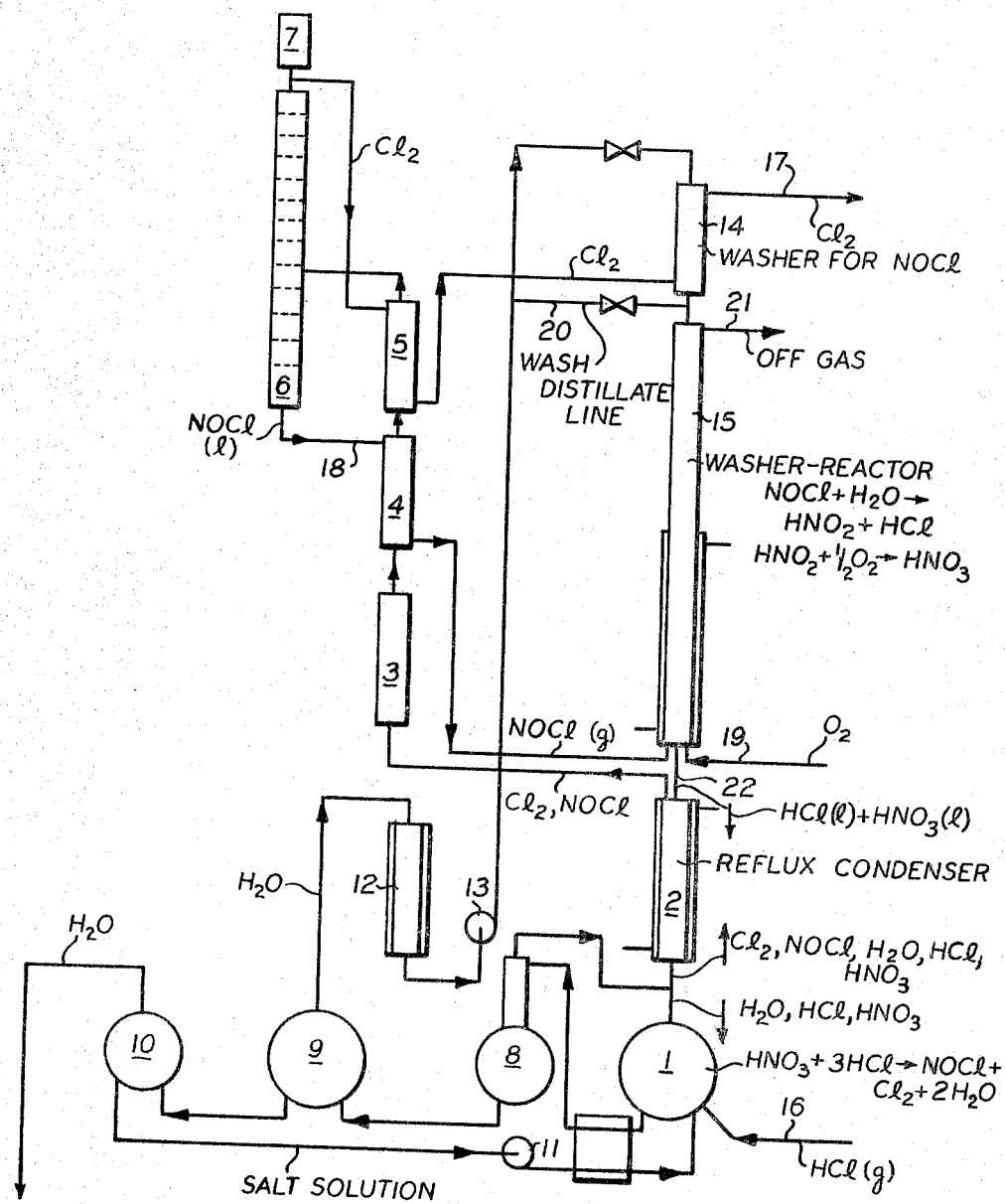

3,318,665
PROCESS FOR THE MANUFACTURE OF CHLORINE AND PROCESS FOR CONVERSION OF NITROSYL CHLORIDE
Wilhelm F. Schmidt, Ranzel, Karl W. Hass, Niederkassel, and Hans G. Epler, Ranzel, Germany, assignors to Dynamit Nobel Aktiengesellschaft, Cologne, Germany, a corporation of Germany
Filed June 15, 1964, Ser. No. 375,394
Claims priority, application Germany, June 21, 1963, D 41,808
7 Claims. (Cl. 23—219)

It is known that hydrochloric acid can be oxidized with nitric acid to form chlorine and nitrosyl chloride or chlorine and $NO_2$, depending on the conditions of the reaction, but all the methods known hitherto have considerable disadvantages. If inexpensive technical nitric acid is used as the oxidant, nitrosyl chloride is produced as a reaction product in addition to chlorine, according to the following equation:

$$HNO_3 + 3HCl \rightarrow Cl_2 + NOCl + 2H_2O$$

and the problem of processing the nitrosyl chloride for the recovery of nitric acid has not yet been solved satisfactorily. It has furthermore developed that the oxidation of hydrochloric acid with nitric acid does not, for thermodynamic reasons, continue until one of the reactants is eliminated, but runs to a state of equilibrium, in which considerable amounts of hydrochloric and nitric acid remain unreacted. Furthermore, the removal of the water of dilution introduced by the reactants and of the water produced in the reaction creates difficulties, since it is impossible to obtain neutral distillates from the solutions which have reacted to the state of equilibrium and still contain considerable amounts of acids.

If concentrated nitric acid (90–100%) is used, however, no nitrosyl chloride is produced, the reaction running as follows:

$$2HNO_3 + 2HCl \rightarrow Cl_2 + 2NO_2 + 2H_2O$$

but 1 mol of nitric acid has to be used for 1 mol of chlorine. Furthermore, the nitric acid diluted by the water of reaction must after a short time be reconcentrated, and the $NO_2$ has to be converted back to highly concentrated acid, which involves considerable technical difficulties. There is no substantial change in this situation if concentrated sulfuric acid is used as a water-binding agent.

Now, the essence of the invention consists in performing the oxidation of the hydrochloric acid with nitric acid in the present of chlorides and/or nitrates whose solubility in water is so great that concentrated solutions of about 40 to around 60 percent can be produced. Suitable are salts, preferably chlorides, of metals of the first 3 groups and of the 8th group of the periodic system, as for example lithium, calcium, sodium, magnesium, potassium, strontium, zinc, cadmium, aluminum, nickel, cobalt or iron. It is expedient, however, to give preference to those salts, such as LiCl which are not broken down by hydrolysis. In such solutions, the oxidation of the hydrochloric acid takes place surprisingly rapidly and almost quantitatively, according to the following equation:

$$HNO_3 + 3HCl \rightarrow NOCl + Cl_2 + 2H_2O$$

Since the metal chloride solution remaining after the reaction contains only a little more acid, the reaction water can be removed from it almost without any loss of valuable nitric acid.

The chlorine formed in the reaction can be separated from the nitrosyl chloride by low-temperature or pressure distillation, and is very pure. The nitrosyl chloride obtained as the sump product receives all of the nitrogen from the nitric acid that was put in, and it has surprisingly developed that the nitrosyl chloride can be broken down and reconverted to nitric acid simply by dissolving the nitrosyl chloride in water and simultaneously or subsequently oxidizing it with oxygen or gases containing oxygen. The following reactions probably take place:

$$NOCl + H_2O \rightarrow HNO_2 + HCl$$
$$HNO_2 + \tfrac{1}{2}O_2 = HNO_3$$

A mixture of nitric and hydrochloric acid is thus obtained which can be concentrated at atmospheric pressure to a content of about 160 g. HCl/l. and 295 g. $HNO_3$/l. This finding is surprising because on the other hand an oxidation of hydrochloric acid with nitric acid to chlorine and nitrosyl chloride is possible. The explanation is, however, as already mentioned above, to be found in the fact that the reaction leads to a state of equilibrium which can be reached from both sides. The mixture of hydrochloric and nitric acid obtained by the breakdown of NOCl can be fed back into the reactor and there be again brought to reaction by the addition of more hydrochloric acid. On the basis of the invention, therefore, it is possible to perform a continuous process which permits the production of chlorine from hydrochloric acid almost without loss. Since the process works at relatively low temperatures, the otherwise considerable corrosion damage is restricted to a minimum. Further advantages result from the fact that impure hydrochloric acid can be processed without having to fear catalyst poisoning, and that the reaction takes place so rapidly that the apparatus required does not have to be large.

The process is performed, for example, with a 50% LiCl solution in a reactor which is made of acid-resistant material such as glazed porcelain, glass, quartz or enameled steel or steel clad with graphite or some other acid-resistant material. The reactor may be filled with a material to increase surface area, such as Raschig rings, for example.

The gasses leaving the reactor consist of chlorine, nitrosyl chloride and water vapor, plus small amounts of HCl and $HNO_3$ as well as traces of permanent gases. Water vapor, hydrochloric acid and nitric acid are condensed in a condenser and carried back to the reactor. Chlorine and nitrosyl chloride are freed of water vapor residues by drying, and then subjected to low-temperature or pressure distillation. Pure chlorine can be taken from the head of the columns, while NOCl in liquid form can be drawn from the sump. The NOCl is fed together with air or oxygen to a washing column, the head of which is supplied with a liquid which contains, in addition to water, small amounts of hydrochloric and nitric acid, and which is obtained by distillation from the reacted metal salt solution from the reactor. The washing can be performed at atmospheric pressure or, advantageously, at elevated pressure.

A plate-type column or a packed column of appropriate construction can be used as a washing column. It is expedient to equip it in its lower portion with a cooling jacket or with cooling coils. Its theoretical number of plates is to be such that a saturated solution of $HNO_3$ and HCl leaves through its outlet, while only oxygen or nitrogen leave from the head. Four theoretical plates have proven sufficient. The liquid leaving the column is fed back to the reactor. On the basis of its composition of 1 mol of $HNO_3$ to 1 mol of HCl, it can be reacted again according to the above-given equation by the addition of 2 mols of gaseous or aqueous hydrochloric acid.

The washing liquid serving for the breakdown and oxidation of NOCl is obtained by distillation from the reacted metal salt solution, it being expedient to proceed in such a manner that the first, more strongly acid portion of the distillate is fed to the bottom part of the column, the medium portion to the head of the column, and the almost neutral remainder can be discarded.

The drawing shows schematically an appropriate apparatus.

The hydrochloric acid oxidation takes place in the reactor 1. The reactor contains a 40–60% metal salt solution and can be provided with packing. It can be brought to the desired reaction temperature by a steam jacket or by a heating coil. The reaction temperature is adjusted to the boiling point of the content of the reactor, and after the reaction starts it is generally kept constant by the heat of reaction. The reactor is fed through line 22 and reflux condenser 2 with the hydrochloric acid and nitric acid mixture flowing from the washing column 15, while gaseous hydrochloric acid is fed in through line 16. The gas mixture leaving the reactor is freed of water vapor, hydrochloric acid and nitric acid in the reflux condenser 2 and fed to the separating column 6 through the dryer 3 and the heat exchangers 4 and 5. The isolated chlorine leaves the column through the heat exchanger 5 and can be freed of traces of NOCl in the washing column 14. The pure chlorine is taken out through the line 17. The isolated nitrosyl chloride leaves the separating column as a liquid through line 18 and heat exchanger 4 and runs into the washing column 15 as a gas, and there it is reacted with the distillate coming from the still 9, which is cooled in the condenser 12 and fed in at the top of the column. The resulting product is transformed to a mixture of hydrochloric and nitric acid by oxygen or gases containing oxygen which are fed through line 19. The hydrochloric acid and nitric acid solution can be concentrated to the extent desired in washer-reactor 15. The salt solution, which has been substantially exhausted by reaction in reactor 1 is largely freed of dissolved gases and the remainder of the unreacted gases in the post-reactor and degasser 8. The gases and vapors are fed to the condenser 2, where the condensable components are condensed and fed back to the reactor 1. The washing water needed for the washing column 15 is isolated in the still 9, while still 10 serves for the removal of the water of reaction. The now almost neutral metal salt solution returns through pump 11 to the reactor 1. 7 represents a dephlegmator, 13 is a pump, 20 is a wash distillate line and 21 is an exhaust gas line.

EXAMPLE 888 g. $HNO_3$ and 514 g. HCl, used as aqueous solution (concentration about 160 g. per liter HCl and 250 g. per liter $HNO_3$) enter, through the line 22 and the reflux-cooler 2, into the reactor 1. Simultaneously, 1028 g. gaseous hydrochloric acid are introduced into the reactor. The reactor contains a solution of lithium chloride (42%) and lithium nitrate (4%). In the reactor occurs at a temperature of 137° C. the formation of 924 g. NOCl, 1000 g. $Cl_2$ and 507 g. $H_2O$. NOCl and $Cl_2$ leave the reactor via the reflux-cooler 2 and the dryer 3. They pass through the heat exchangers 4 and 5 and on into the low temperature column 6, where NOCl in chlorine are separated through distillation. The chlorine (1000 g.) leaves the column over head and passes off as pure chlorine, via the heat exchanger 5, the washer 14 and the line 17. The NOCl leaves the column via the sump (924 g.), is evaporated in the heat exchanger 4 and introduced in gas-form into the saponification and oxidation column 15. Column 15 is charged with about 3.6 liters of water per 924 g. NOCl, via the washer 14. This water, as well as the reaction water, first dilute the salt solution present in the reactor. So that the dilution does not become too strong, 50 liters reaction fluid should be in the reactor per kilo of chlorine to be produced. From the reactor 1 the liquid first enters into the after-reactor 8, in which the reaction finishes, then into the distillation-vessel 9, where 3.6 liters water are distilled-off. The condensate resulting in the cooler 12 is pumped by the pump 13 to the washer 14. In the distillation vessel 10 the reaction water (507 g. per kg. chlorine) is removed and may be discharged to a sewer, since it only contains 5 g. per liter HCl and 0.76 g. $HNO_3$. As to heat employed the heat quantity necessary is for the evaporation of 4.1 liters water, thus about 2460 kg. cal./kg. chlorine. Furthermore the energy, which is necessary is for the separation of 924 g. NOCl and 1000 g. chlorine in the column 6. Furthermore the necessary cooling water quantities are, in order to draw-off 2460 kg. cal.

Percentages herein are in weight percent unless otherwise indicated. As well as the salts mentioned ammonium salts can be used.

What is claimed is:

1. Process for production of chlorine which comprises contacting hydrochloric acid and nitric acid in an aqueous medium having dissolved therein a chloride salt of metal selected from the group consisting of Group I, II, III, and VIII, at a temperature and for a time sufficient for reaction I, below, to go substantially to completion, and with evolution of chlorine and nitrosyl chloride as a gas admixture:

(I) $$HNO_3 + 3HCl \rightarrow Cl_2 + NOCl + 2H_2O$$

separating the chlorine-nitrosyl chloride gas admixture into chlorine product and nitrosyl chloride, reacting the separated nitrosyl chloride with water and oxygen to produce nitric acid and hydrochloric acid, and returning the nitric acid and hydrochloric acid so produced to said aqueous medium for reaction according to reaction I, and removing a portion of the aqueous medium and distilling water from the withdrawn aqueous medium to remove water of reaction formed by reaction I and concentrate the metal salt contained in the withdrawn aqueous medium, and returning the concentrate to said aqueous medium in which the hydrochloric acid and nitric acid are contacted.

2. Process according to claim 1, wherein said chloride salt is lithium chloride.

3. Process according to claim 1, wherein the concentration of said chloride salt in the medium in which the hydrochloric acid and nitric acid are contacted is about 40–60% of the medium.

4. Process according to claim 3, wherein said chloride salt is lithium chloride.

5. Process according to claim 1, wherein water obtained by said distillation of said withdrawn aqueous medium is reacted with nitrosyl chloride and oxygen in said reaction of nitrosyl chloride, water and oxygen.

6. Process according to claim 5, wherein the concentration of said chloride salt in the medium in which the hydrochloric acid and nitric acid are contacted is about 40–60% of the medium.

7. Process according to claim 6, wherein said chloride salt is lithium chloride.

References Cited by the Examiner

UNITED STATES PATENTS

| | | | |
|---|---|---|---|
| 1,899,123 | 2/1933 | Uebler | 23—219 |
| 2,148,793 | 2/1939 | Agel | 23—219 X |
| 2,240,668 | 5/1941 | Reed | 23—219 |
| 2,731,329 | 1/1956 | Kamlet | 23—219 |
| 2,855,279 | 10/1958 | Walter | 23—219 |
| 3,210,153 | 10/1965 | Marullo et al. | 23—219 X |

OSCAR R. VERTIZ, Primary Examiner.

EDWARD STERN, MILTON WEISSMAN, Examiners.